(12) United States Patent
Das

(10) Patent No.: US 9,510,158 B2
(45) Date of Patent: Nov. 29, 2016

(54) REMOTE COMMUNICATION DEVICE CALL ORIGINATION USING A DATA CHANNEL COMMUNICATION PATH

(75) Inventor: Swapan Das, Canton, MI (US)

(73) Assignee: General Motors LLC, Detroit, MI (US)

( * ) Notice: Subject to any disclaimer, the term of this patent is extended or adjusted under 35 U.S.C. 154(b) by 626 days.

(21) Appl. No.: 13/477,758

(22) Filed: May 22, 2012

(65) Prior Publication Data

US 2013/0295889 A1 Nov. 7, 2013

Related U.S. Application Data

(60) Provisional application No. 61/643,221, filed on May 4, 2012.

(51) Int. Cl.
*H04W 4/00* (2009.01)
*H04W 4/04* (2009.01)

(52) U.S. Cl.
CPC .................................. *H04W 4/046* (2013.01)

(58) Field of Classification Search
CPC .. H04L 2207/18; H04W 4/16; H04W 8/245; H04W 12/02
USPC ........... 455/414.1, 569.1, 417, 418; 380/270, 380/275, 30
See application file for complete search history.

(56) References Cited

U.S. PATENT DOCUMENTS

| | | | |
|---|---|---|---|
| 5,602,901 A | 2/1997 | Redden et al. | |
| 6,044,263 A | 3/2000 | Valentine et al. | |
| 6,130,933 A | 10/2000 | Miloslavsky | |
| 6,654,457 B1 | 11/2003 | Beddus et al. | |
| 8,224,362 B1 | 7/2012 | Osinga | |
| 2002/0114315 A1 | 8/2002 | Kangas | |
| 2004/0203672 A1 | 10/2004 | Crocker et al. | |
| 2005/0099275 A1 | 5/2005 | Kamdar et al. | |

(Continued)

FOREIGN PATENT DOCUMENTS

| CA | 2814850 A1 | 11/2013 |
|---|---|---|
| CN | 101656932 A | 2/2010 |

(Continued)

OTHER PUBLICATIONS

GB Search and Examination Report for corresponding application No. GB1308064.3, Oct. 7, 2013, 6 pages.

(Continued)

*Primary Examiner* — Phuoc H Doan
(74) *Attorney, Agent, or Firm* — Christopher DeVries; Reising Ethington P.C.

(57) ABSTRACT

A system and method for carrying out communications with a remote communication device (RCD) utilizes a data channel communication path to provide a call request from the RCD to a telematics services provider (TSP). In response to the call request, the TSP obtains a temporary phone number and sends it back to the RCD which then places a voice call to the TSP using the phone number. The received call is connected to an advisor to handle voice communication with the caller using the RCD. Based on the prior association of the assigned temporary phone number with the calling RCD, the TSP is able to recognize the caller or calling device based on the number called and then automatically provide the advisor with relevant information about the caller or calling RCD, such as the caller's name or subscription account information.

28 Claims, 5 Drawing Sheets

(56) References Cited

U.S. PATENT DOCUMENTS

| | | | |
|---|---|---|---|
| 2005/0136899 A1* | 6/2005 | Pines et al. | 455/414.1 |
| 2008/0144827 A1* | 6/2008 | Davis et al. | 380/270 |
| 2008/0146291 A1* | 6/2008 | Huisken | 455/569.1 |
| 2009/0168974 A1 | 7/2009 | McCormick | |
| 2011/0153148 A1 | 6/2011 | Edwards et al. | |
| 2011/0250877 A1 | 10/2011 | Krause et al. | |
| 2011/0294466 A1 | 12/2011 | Tang et al. | |
| 2012/0058756 A1* | 3/2012 | Olincy et al. | 455/417 |
| 2013/0295889 A1 | 11/2013 | Das | |

FOREIGN PATENT DOCUMENTS

| | | | |
|---|---|---|---|
| DE | 19581853 | B4 | 10/2009 |
| EP | 0843454 | A2 | 5/1998 |
| EP | 1041842 | A2 | 10/2000 |
| GB | 2309617 | A | 7/1997 |
| WO | WO9619908 | A1 | 6/1996 |
| WO | WO9827782 | A2 | 6/1998 |
| WO | WO2012134623 | A1 | 10/2012 |

OTHER PUBLICATIONS

GB Search and Examination Report for corresponding application No. GB1308059.3, Oct. 31, 2013, 2 pages.
References cited in German Office Action corresponding to German Patent Application No. 10 2013 208 110.3, dated Aug. 22, 2014.
DE Office Action for application No. 10 2013 208 111.1, dated Aug. 21, 2014, 7 pages (not translated).
GB Examination Report corresponding to application No. GB1308064.3, dated Nov. 19, 2014, 2 pages.
Canadian Office action corresponding to CA application No. 2,814,868, dated Oct. 2, 2015, 3 pages.

* cited by examiner

US 9,510,158 B2

REMOTE COMMUNICATION DEVICE CALL ORIGINATION USING A DATA CHANNEL COMMUNICATION PATH

CROSS-REFERENCE TO RELATED APPLICATIONS

This application claims the benefit of U.S. Provisional Patent Application No. 61/643,221 filed May 4, 2012, the entire contents of which are hereby incorporated by reference.

TECHNICAL FIELD

The present invention relates to mobile and other remote device-originated wireless telecommunications and, more particularly, to the use of such telecommunications to provide services to remote communication device users.

BACKGROUND

Telematics services providers (TSPs) deliver services to customers via one or more wireless and/or wireline communication systems, such as cellular networks or public switched telephone networks (PSTN). Vehicle telematics services providers are one such example of a TSP. The provision of such services often involves communication with a mobile or other remote communication device (RCD) such as cellular phones, vehicle telematics units, medical equipment and other fixed or mobile remotely located communication equipment, many of which may use different communication technologies or generations of technologies (e.g., wireless 2G, 3G, 4G, etc.). Delivering telematics services to a subscriber base means that a TSP must either limit their subscriber base to a subset of all potential customers, or that the TSP support the many different and sometimes competing technologies.

SUMMARY

An object of the embodiments disclosed herein is to help overcome the difficulty in accommodating different technologies in the provision of services to subscribers and other users of the services. Another object is to provide a method and apparatus that helps speed the delivery of such services and improves the customer experience when requesting such services.

According to an embodiment of the invention, there is provided a method of carrying out communications with a remote communication device, comprising the steps of: (a) receiving a transmission identifier at a data center over a data channel communication path from a remote communication device (RCD); (b) associating a call center phone number with the transmission identifier; (c) sending the phone number to the RCD via a data channel communication path; and (d) accessing information associated with the RCD or a user of the RCD.

According to another embodiment of the invention, there is provided a method of carrying out communications with a remote communication device, comprising the steps of: (a) receiving at a call center information that is associated with a remote communication device (RCD) or user of the RCD, and associated with a single session phone number temporarily assigned to the RCD; (b) receiving a voice call initiated from the RCD using the phone number; (c) providing the information to an advisor; and (d) connecting the voice call to the advisor.

According to yet another embodiment, there is provided a method of carrying out communications with a remote communication device, comprising the steps of: (a) receiving a phone number for a remote communication device (RCD) that is sent from the RCD via a data channel communication path; (b) placing a voice call to the RCD using the received phone number; and (c) providing a service to a user of the RCD in conjunction with the voice call.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

Figure 1:
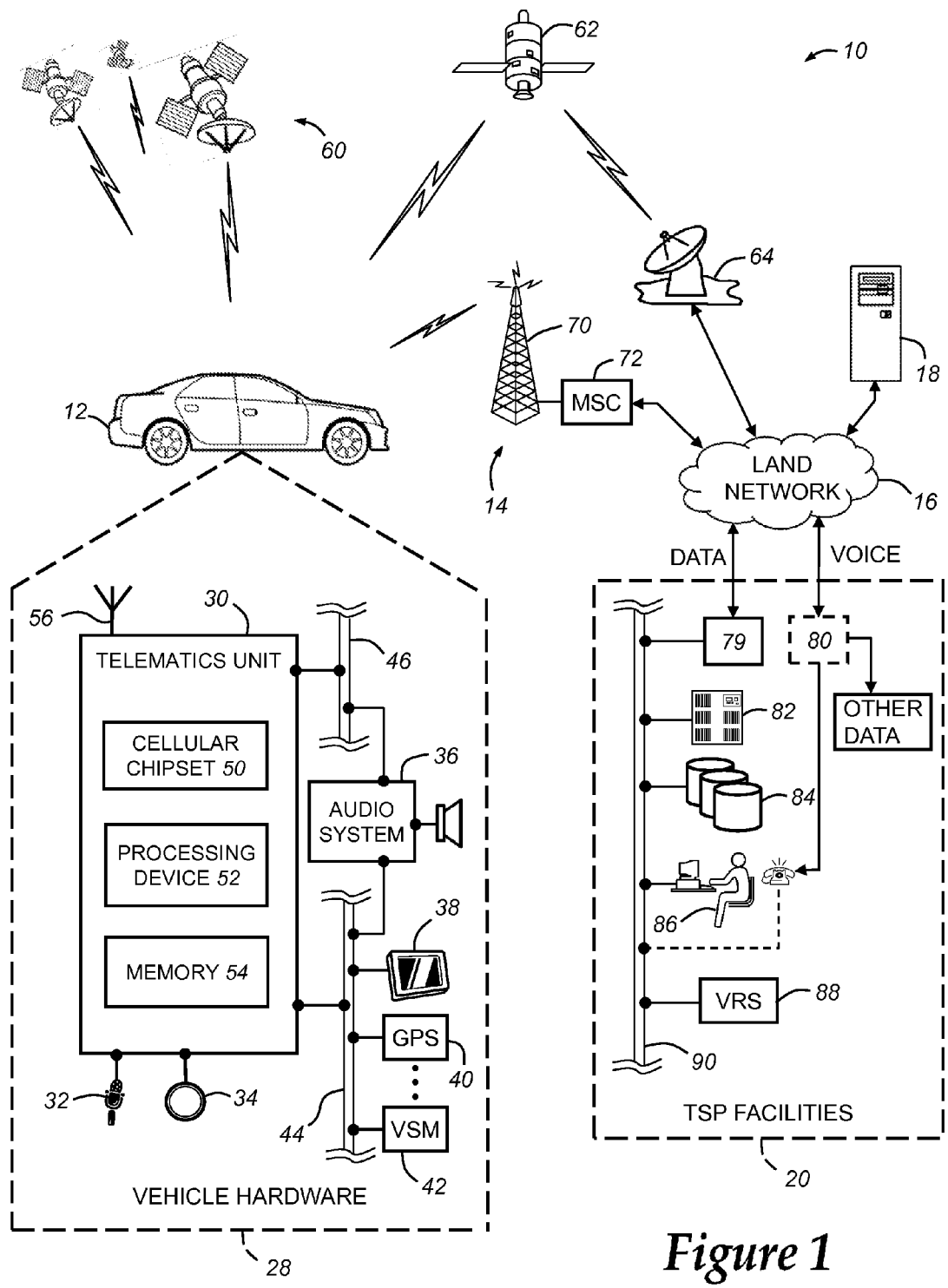
FIG. 1 is a block diagram depicting an embodiment of a communications system that is capable of utilizing the method disclosed herein.

The following terms have the meanings indicated:

Mobile Communication Device (MCD) is a portable wireless electronic device that supports voice and data communication. MCDs include vehicle telematics units, handheld devices such as portable cellular phones, and other wireless communication devices such as remote monitoring, diagnostic, or control devices.

Remote Communication Device (RCD) is a wireless or wireline electronic device that supports voice and data communication and that is located geographically remotely (i.e., at a different location) than that of a telematics service provider (TSP) that provides services to a user of the RCD. RCDs include MCDs as well as fixed or remote electronic devices that have hardwired access to a public switched telephone network (PSTN) or other network (e.g., Internet) that permits it to communicate with a TSP.

Telematics Services Provider (TSP) is an organization, or plurality of organizations together, that provides data, information, control, and/or other services (collectively referred to as telematics services) to users of an MCD or other RCD. TSPs include: (1) wireless service providers that supply telematics services wirelessly to users having RCDs; (2) wireline service providers that supply telematics services over PTSN, Internet and/or other hardwired connections; and (3) service providers that supply telematics services using a combination of wireless and wireline communication paths. The users may be subscribers, such as in the case of vehicle telematics services providers or other organizations that provide information, entertainment or other pay-for-service subscriptions. The users may be other consumers of the services, (such as patients to an in-home health services company or hospital system, or subscribers to residential or commercial alarm monitoring or other security services), or members of the public generally in need of governmental or other organizational services such as emergency response services provided by medical, police, and fire departments via a public safety answering point (PSAP). The user may be the TSP itself, such as where the organization's employees work in the field or where the organization uses remotely-located equipment.

Transmission identifier is an identifier sent by the RCD. It may be:
1. a remote device identifier that may or may not uniquely identify the device from others. Examples include a serial # of the device or of an associated device (such as the VIN of a vehicle in which the device is installed or a physical or logical address at which the device is located), or an indicator of a supported wireless technology (e.g., 2G v. 4G);
2. a user identifier (user's name, account number, or other ID); or
3. a situational identifier (e.g., calling code indicating some attribute of the call—purpose, priority, service desired, etc.)

Data channel communication path is a one or two-way data connection used by the RCD that does not rely on use of a circuit switched voice channel by the RCD for data modem or DTMF signaling. Examples of a data channel communication path include packet switched data connections and SMS, using technologies such as LTE, HSPA+, EDGE, UMTS, WiFi, WiMAX, EV-DO, SMPP, etc.

The methods and apparatuses described below permit a user of the RCD to make an RCD-originated call request for telematics services from a telematics services provider (TSP) in a manner that may be largely independent of the particular data and voice communication technology used. The embodiments disclosed below show how such communication may be effected using cellular networks; however, it will be appreciated to those skilled in the art that other wireless and wireline communication technologies could be used in according to the methods and techniques disclosed herein. Furthermore, the disclosed methods and apparatuses may be used in at least some embodiments to provide improved delivery of services to subscribers and other users.

As will be described in greater detail below, the embodiments include techniques used by the RCD and TSP (using a call center and data center) to carry out an overall process that involves a call request originating from the RCD over a data channel communication path, with this call request being used to initiate a subsequent voice call between the RCD and TSP. In some embodiments, a call center phone number is obtained in response to the call request and provided to the RCD over the same or another data channel communication path, following which the RCD places a voice call to the call center using the phone number given to it. That voice call may then be routed (connected) to an advisor at the call center for delivering the telematics services being requested by the user. The phone number may be selected or otherwise obtained based on any one or more of a number of factors, including: the wireless or other communication technology supported by the RCD; a calling code or other situational identifier relating to the purpose or priority of the call; or some attribute of a user of the RCD, such as the native or desired language spoken by the user. Also, by using a remote device identifier sent as a part of the data channel communication path call request, subscriber information associated with the caller or calling RCD (e.g., subscriber name, account information, etc.) may be obtained and made available to the advisor so that the voice call may be commenced with subscriber information already displayed or otherwise made available to the advisor. In other embodiments, the call request may include the RCD phone number which is then used by the TSP to place the voice call to the RCD. These and other features and benefits will become apparent from the description below.

The following described embodiment(s) are directed to a vehicle telematics system in which a mobile communication device (MCD) in the form of a vehicle telematics unit is used in conjunction with the provision of telematics services based on wireless communication between the telematics unit and TSP. It will be appreciated by those skilled in the art that other mobile and fixed RCD implementations may be implemented in accordance with the teachings below.

Communications System—

With reference to FIG. 1, there is shown an operating environment that comprises a mobile vehicle communications system 10 and that can be used to implement the methods disclosed herein. Communications system 10 generally includes a vehicle 12, one or more wireless carrier systems 14, a land communications network 16, a computer 18, and TSP facilities 20. It should be understood that the disclosed method can be used with any number of different systems and is not specifically limited to the operating environment shown here. Also, the architecture, construction, setup, and operation of the many portions of system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with TSP facilities 20, other telematics-enabled vehicles, or some other entity or device. The telematics unit preferably uses radio transmissions to establish one or more communications channels with wireless carrier system 14 so that voice and data transmissions can be sent and received over the channel(s). By providing both voice and data communication, telematics unit 30 enables the vehicle to offer a number of different wireless services including those related to navigation, telephony, emergency assistance, diagnostics, infotainment, etc. Data can be sent via a data channel communication path, such as via packet data transmission over a data channel. In some embodiments, data communication may also be available via a voice channel using an in-band data modem that uses a modulation approach suitable for the wireless carrier network equipment being used. For combined wireless services that involve both voice communication (e.g., with a live advisor or voice response unit at the TSP facilities 20) and data communication (e.g., to provide GPS location data or vehicle diagnostic data to the TSP facilities 20), the system may utilize a voice channel for voice and a data channel communication path for data, or may utilize a newer generation technology such as LTE that supports simultaneous voice and data together.

According to one embodiment, telematics unit 30 utilizes cellular communication according to a cellular communication standard (GSM, CDMA, etc.) and thus includes a standard cellular chipset 50 for voice and data communications (like hands-free calling and software/data transfer to and from the telematics unit), an electronic processing device 52, one or more digital memory devices 54, and a dual antenna 56. Data transmission may operate using any number of different standards or protocols such as LTE, EVDO, CDMA, GPRS, EDGE, SMS. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of wireless services that involve wireless communication between the vehicle and TSP 20. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. Wireless services may also be provided that do not involve operation or function of the vehicle itself; such as remotely controlling the operation of a home security system or home automation system. The above-listed services are by no means an exhaustive list of all of the capabilities of telematics unit 30, but are simply an enumeration of some of the services that the TSP is capable of offering via the telematics unit. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to TSP facilities 20 or other remote computer system, such as computer 18, for other purposes, such as fleet management. Also, new or updated map data can be downloaded to the GPS module 40 from the TSP facilities 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the TSP facilities 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is a wireless network such as a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional wireline network such as a land-based telecommunications network that is connected to one or more landline telephones and connects wireless carrier system 14 to TSP facilities 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, TSP facilities 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or TSP facilities 20, or both. A computer 18 can also be used for providing Internet connectivity such as DNS services or as a network address server that uses DHCP or other suitable protocol to assign an IP address to the vehicle 12.

In some embodiment, computer 18 may be an RCD that might be used in connection with wireline telematics services provided by TSP 20 or some other TSP; for example, either in connection with the provision of telematics services, or for other applications such as in-home health care services, home security, etc. Data and voice communication via the computer may be carried out using an Internet connection via, for example, TCP/IP and VoIP.

TSP facilities 20 are designed to provide the vehicle electronics 28 with a number of different system back-end functions and other wireless services and, according to the exemplary embodiment shown here, generally includes a data gateway 79, optional switches 80, servers 82, databases 84, live advisors 86, as well as an automated voice response system (VRS) 88, all of which are known in the art. These various TSP facilities' components are preferably coupled to one another via a wired or wireless local area network 90. Database 84 can store subscriber account information such as subscriber name and other contact information, subscriber authentication information, vehicle identifiers, profile records, language(s) spoken, behavioral patterns, and other pertinent subscriber information. Data transmissions may also be conducted by wireless systems, such as 802.11x, GPRS, and the like. Although the illustrated embodiment has been described as it would be used in conjunction with a manned TSP facilities 20 using live advisor 86, it will be appreciated that the TSP facilities can instead utilize VRS 88 as an automated advisor or, a combination of VRS 88 and the live advisor 86 can be used.

Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication are conducted via the data gateway 79 and network 90.

Other data communication may be conducted with the TSP 20 via switch 80, and can be implemented via a modem (not shown) or DTMF signaling, as is know in the art connected. However, as discussed below, various embodiments in accordance with the disclosed methods may be used to establish data connections that do not rely upon DTMF or modem-based voice channel transmissions at all, thereby allowing elimination of PBX switch 80 altogether with data coming into the TSP facilities by SMS, packet switched or other data channel communication path via data gateway 79, and voice coming into the TSP facilities via a circuit switched connection to land network 16.

In the embodiment of FIG. 1, TSP facilities 20 includes both a data center (comprising gateway 79, server(s) 82, database(s) 84, and network 90) and a call center (comprising advisors 86 and their illustrated phones and computer terminals connected to the data center, VRS 88, and portions of network 90). In some embodiments the TSP facilities may be implemented by one or more central facilities, at least some of which have an integrated data center and call center, as shown. In other embodiments, the data center operations may be bifurcated from the call center operations and each carried out using one or more geographically separate facilities with suitable communication connections between the different facilities as needed. An example use of this separation of facilities is where call center operations are established in different countries for one or more reasons such as labor and/or communications costs, or for availability of native language advisors to support different subscribers' language requirements.

Figure 2:
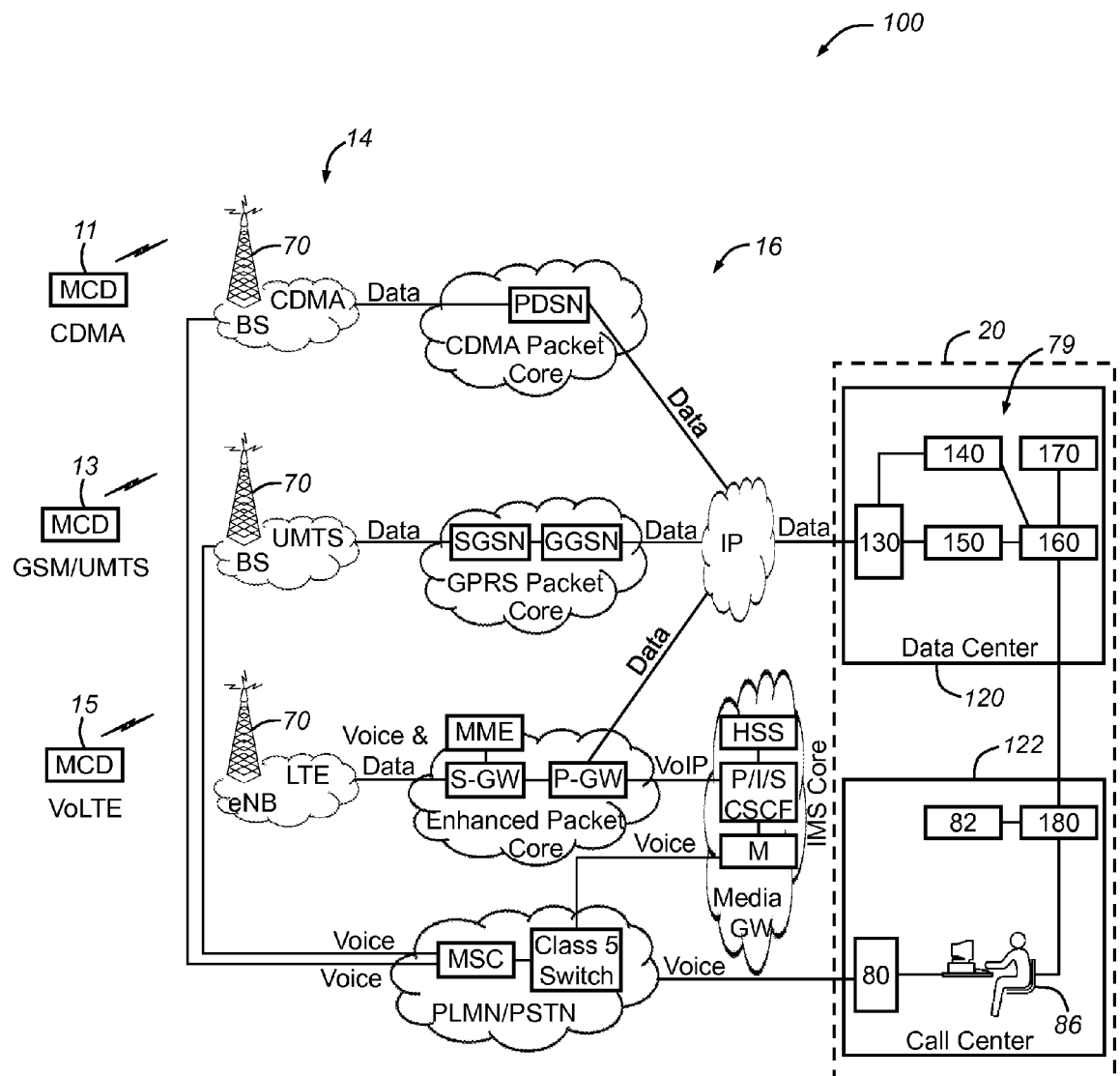
FIG. 2 is a block diagram depicting additional details of portions of a communications system such as that of FIG. 1 or that may be used in other embodiments.

Turning now to FIG. 2, there is shown further infrastructure detail which may be used as a part of the system 10 of FIG. 1 or may be used as part of a separate embodiment. And, while FIG. 1 shows an embodiment adapted for providing wireless telematics services to a vehicle user, it will be appreciated that vehicle 12 is but one of a number of different types of MCDs and that the system of FIG. 1 could be used instead to provide wireless services to a handheld cellular phone user, or for other remote devices such as used in home security systems, for remote monitoring used in health services, emergency responder services, etc. FIG. 2 depicts a more generalized embodiment 100 in that it is not uniquely designed for use with a vehicle telematics unit, but may be used for that or any of a wide variety of other types of wireless services delivered by a TSP using mobile devices used by a subscriber or other user.

As with the embodiment of FIG. 1, the wireless communication system 100 of FIG. 2 includes one or more wireless carrier systems 14, a land communications network 16, and a TSP 20. It uses MCDs such as 11, 13, and 15 which are shown for exemplary reasons to indicate some of the different cellular technologies over which the communication methods described below may be used.

TSP facilities 20 includes a data center 120 and a call center 122. As noted above and shown in FIG. 2, in some embodiments these two centers 120 and 122 may be implemented as separate facilities (e.g., geographically separated or dispersed). In other embodiments they may be combined together within the same central facility. And each of the centers 120, 122 themselves may be implemented by one or more geographically separated facilities. Data center 120 provides data communication and telematics applications using the following components: firewall 130 which may be a commercial off-the-shelf (COTS) firewall used to protect the TSP from external networks, a data gateway 79 that may include a packet data gateway 140 and SMS gateway 150. Packet data gateway may be used with a packet switched connection to land network 16 (e.g., the Internet) to establish a packet data connection to any of the MCDs 11, 13, 15, so that data may be sent and received over the packet data connection using standard HTTP or a proprietary protocol over TCP/IP or UDP/IP to list two examples. SMS gateway 150 may be used send and/or receive SMS to/from the MCDs using, for example, an SMPP protocol. Data center 120 also includes a separate communication service 160 which may provide communication services over packet data, SMS, or circuit switch (not shown) using, for example, an air interface specification protocol. And, data center 120 includes wireless services applications 170 which are applications for providing wireless services either back to the user via their MCD or via TSP or other third party service providers. This may include: health services using, for example, remote monitoring and/or diagnostic equipment such as may be used for in-home patient care; consumer services that involve personnel or equipment that deliver on-site services to the consumers (e.g., package courier services or in-home mechanical or maintenance services such as appliance repair); utility services (gas, electric installation, maintenance, and repair); and emergency responder services (paramedic or other health professionals, police, fire), to name but a few. Many if not all of these services may be provided using wireless communication services; however, in other embodiments they may be provided via wireline communications or a combination of wireless and wireline services.

For vehicle telematics services, the applications 170 provided by or through the TSP may include stolen vehicle tracking and recovery, theft notifications, alarm crash notification, emergency call, road side assistance, remote door lock/unlock, navigation services, vehicle diagnostics and any other services.

Call center 122 provides voice communication and call center applications using the following components: PBX/ACD switch 80, server(s) 82 (including database(s) 84; see FIG. 1), advisor 86, and call center applications 180 which may maintain a pool of phone numbers for an incoming call and direct a call to an appropriate advisor 86 as described below in greater detail. The advisor 86 may handle voice communication with the user of the MCD and access or initiated the services using applications 170. The use of switch 80, server(s) 82, database(s) 84, and advisor 86 are described above.

Method—

Figure 3:
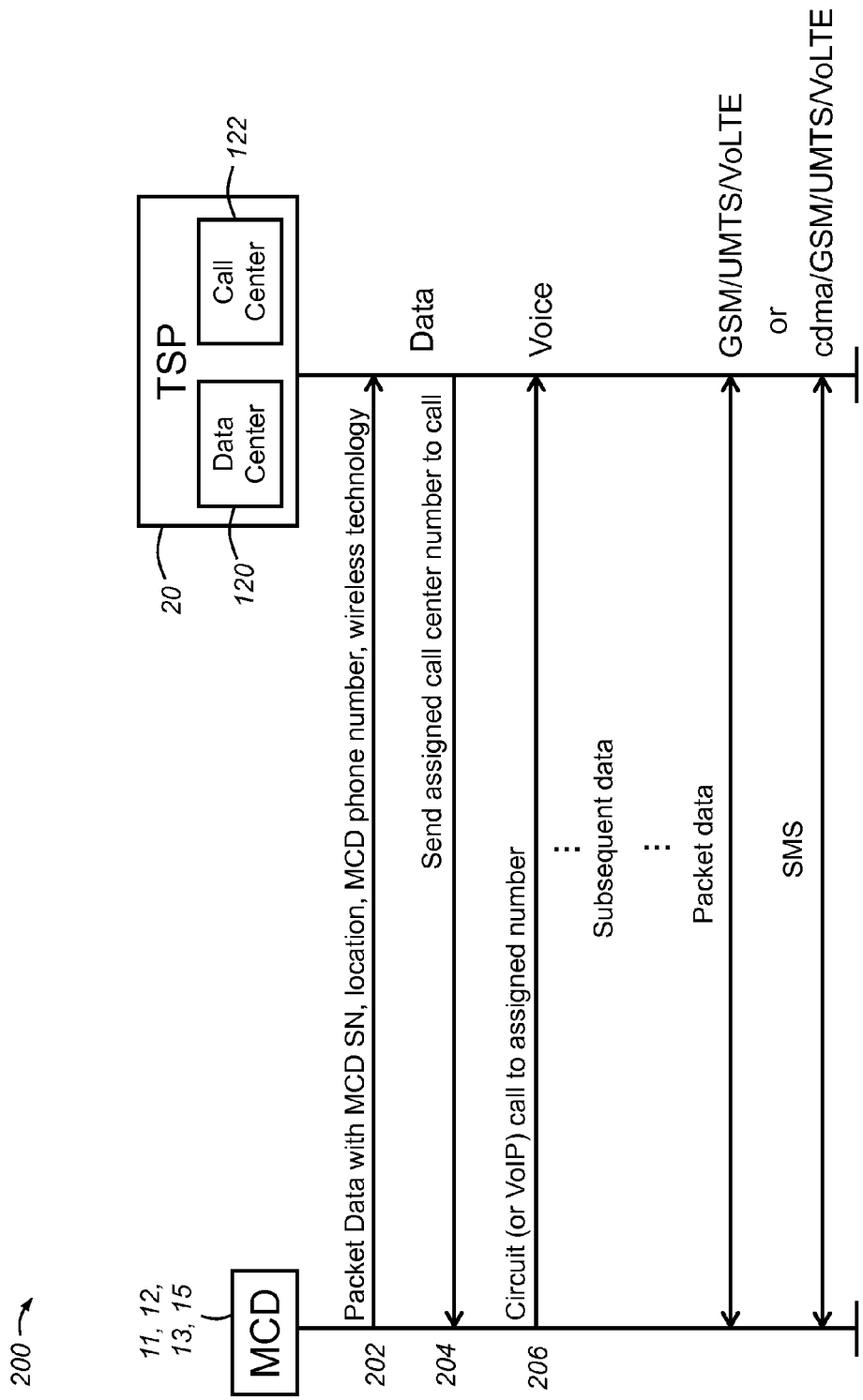
FIGS. 3-5 depict example embodiments using call flows to depict methods for carrying out communications using a remote communication device.
Figure 4:
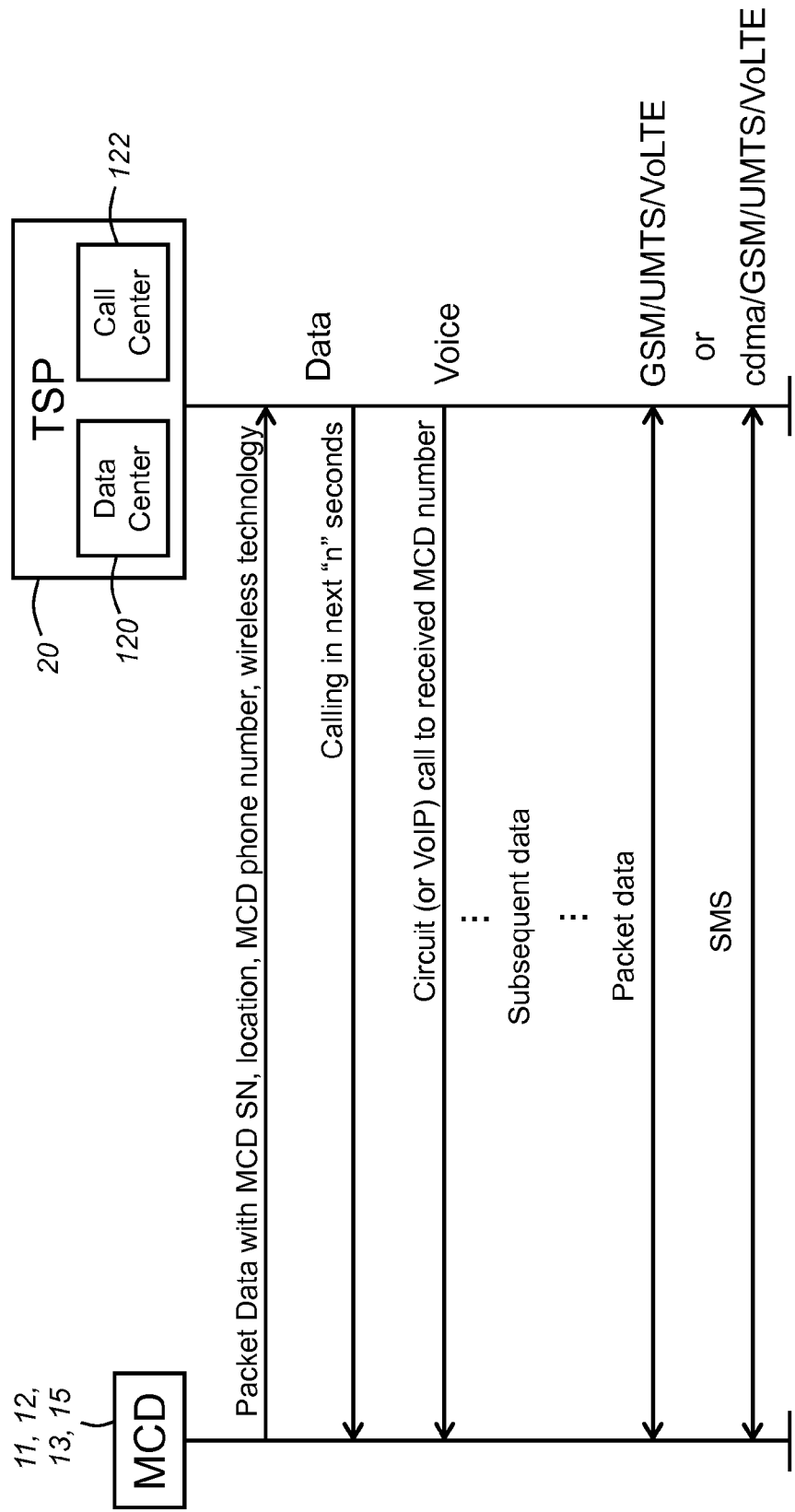
Figure 5:
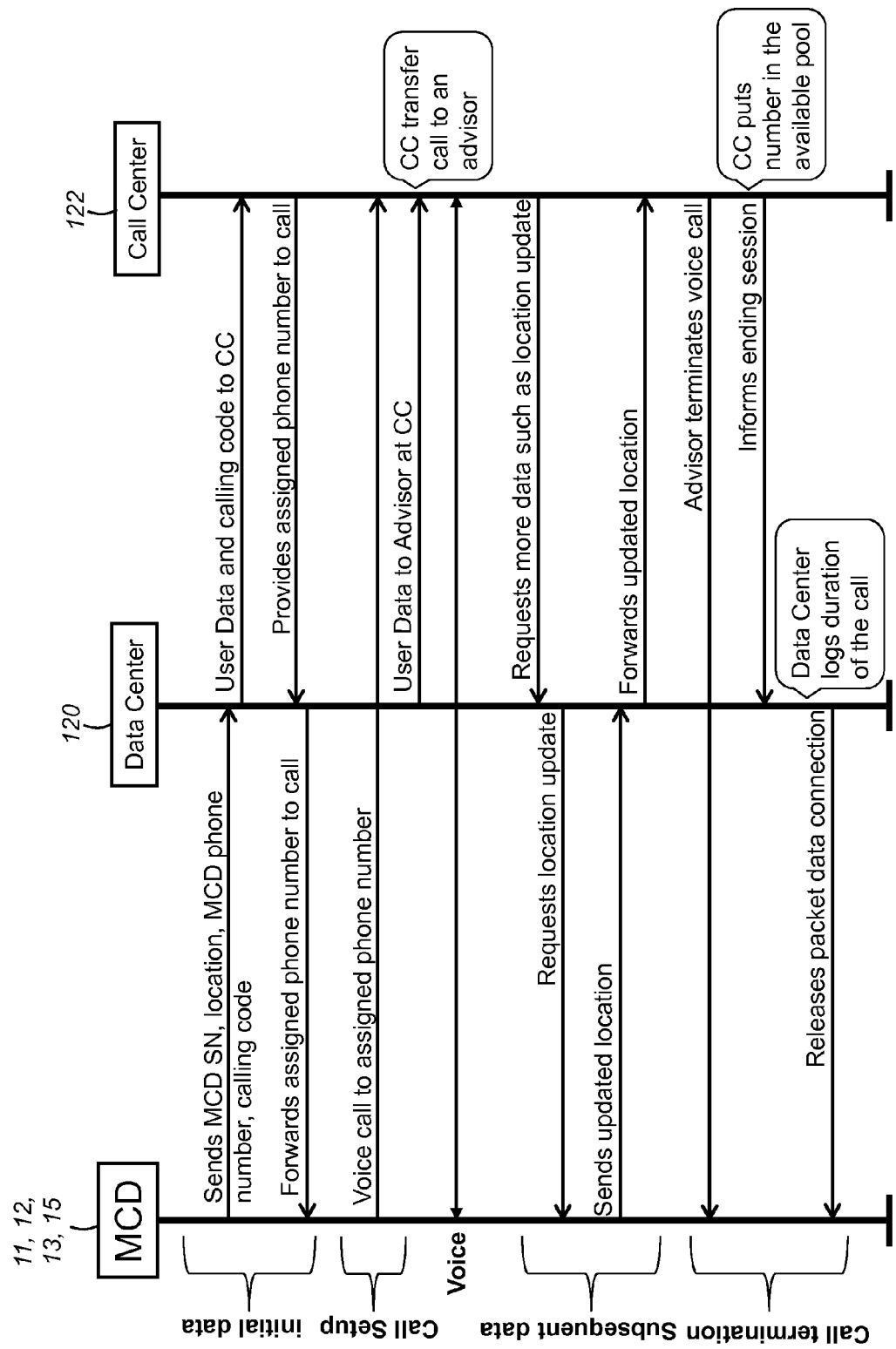

Turning now to FIGS. 3-5, there are shown different methods for carrying out communications using an MCD such as vehicle 12 or the more generic MCDs 11, 13, 15 noted above. These methods are merely illustrative of one embodiment and many others will become apparent to those skilled in the art. Moreover, although these methods are described as they may be carried out over a wireless network, such as shown in FIGS. 1 and 2, it will be appreciated that they are applicable as well to wireline communication. Each method is shown as a call flow depicting the communication between the MCD and data center/call center of the TSP. Each of the flows shown may include one or more steps occurring between the communications sent in each direction, as will be discussed below and as will be understood by those skilled in the art. The method starts at step 202 and begins by sending a call request from the MCD to the TSP using a data channel communication path, in this case a packet switched data connection. This call request may be initiated by the MCD user such as by initiating a TSP services call from the MCD such as by, for example, via an app (application) in the case of a cellular handset MCD or via a press of button 34 or voice command via microphone 32 in the case of a vehicle telematics MCD as shown in FIG. 1. The call request may also be initiated automatically by the MCD or an associated device, such as by initiating a call in response to a crash sensor on vehicle 12 indicating occurrence of a collision.

Included with the call request are one or more transmission identifiers that may be used to identify the caller, calling MCD, or the purpose or priority of the call. In the example shown, the call request includes three mobile device identifiers—an MCD SN (serial number), the MCD phone number, and data indicating the wireless technology (e.g., CDMA or 4G) used by the MCD. The call request may also include additional data which in this case is the MCD location that may be obtained using a GPS receiver on the MCD or otherwise. For a vehicle telematics application such as shown in FIG. 1, the MCD SN may be the vehicle VIN (i.e., an identifier assigned to the vehicle 12 on which the telematics unit 30 is installed), or a telematics unit serial number (e.g., an ESN), the MCD phone number may be the telematics unit phone number, the wireless technology data would indicate the type of cellular communication circuitry 50, and the location would be the vehicle location as determined by GPS receiver 40. For other applications similar identifiers could be provided or different or additional transmission identifiers used, as well as other data usable or potentially usable by TSP in providing the initial call setup or other services. For example, for a handheld cellular phone, possible mobile device identifiers include the cellular phone number, the cellular phone's hardware address, serial number, data certificate, assigned device name, or wireless technology used for the mobile unit (e.g., voice capability, data capability, voice and data capability), etc.

Other transmission identifiers include user identifiers and situational identifiers. Suitable user identifiers include a user's name, date of birth, SSN, or other uniquely identifying data, or some combination of these, or subscriber account number or other information from which a database record associated with the user or the user's MCD may be determined. Situational identifiers may include a calling code indicating the purpose or priority of the call, or other information indicative of the MCD or user's situation or desired services being requested. As will be described below, the particular transmission identifier(s) sent may be used by the TSP for various purposes, including accessing user or subscriber account information, as well as proper call assignment to a suitable advisor for the particular caller or service being requested.

At step 204 a call center phone number is obtained, associated with the transmission identifier(s), and sent to the MCD. This call center phone number will then be used by the MCD to place a voice call to the call center, as will be described below in connection with step 206. The call center phone number may be a single session phone number assigned temporarily for the voice call from the MCD. By assigning a particular phone number to this particular call request, the call center 122 can determine who or what MCD is calling when the call is received. This is advantageous because the particular phone number selected and assigned for the call session may be obtained at least in part based on the transmission identifier(s) and/or other information received in the call request. For example, where the call request includes a calling code indicating emergency responder services may be needed, that calling code may be used to select a phone number associated with a group of advisors specially trained to handle such emergency situations. Or, a calling code indicating a request for account or subscription services, such as for billing or to add additional minutes to a calling plan, may be used to select a call center phone number associated with an advisor suitable for handling those requests.

As another example, where a mobile device identifier or user identifier is included in the call request that permits a database record to be accessed for that user, the user information accessed from the database may be used in selecting a call center phone number. For example, a user's particular language requirement (e.g., speaks Spanish) stored in the user's record in the database may be accessed and used to select a call center phone number associated with an advisor that satisfies that language requirement (e.g., also speaks Spanish). This could permit assignment of a phone number for a call center staffed with or geographically located in a country where the identified language is spoken. As another example, a subscriber's account status (e.g., expired v. in good standing) may be checked and a call center phone number may be assigned based at least in part on the account status.

Apart from using the transmission identifier or other additional data sent with the call request to select a temporary call center phone number, the transmission identifier and/or additional data may be used upon receipt of a voice call to the assigned number to route (connect) the voice call to a suitable advisor. Thus, for the account status check noted above, a call received by a central facility call center may be routed internally to a subscription services department where the account is not in good standing, versus routing it to an advisor trained in providing subscribed services. Or, the language requirement for a caller may be used, not to select and assign a particular call center phone number, but to route the voice call once received to an advisor that satisfies that language requirement. This may be useful, for example, where a call center employs different advisors within the facility who speak different languages.

Selection and assignment of the temporary call center phone number may also be based on other factors such as geographic location of the MCD, either via location information sent by the MCD, or via a country code or area code of the MCD phone number, or by geographically resolving a dynamic IP address assigned to the MCD. Such geographical information may be used in selecting the call center phone number to assign for such purposes as minimizing call costs, etc.

The determination of whether to use some or all of the available call request and user/MCD data may depend on the particular call center operations. For example, where advisors may be operating at independent locations (e.g., out of their individual homes), the available data may be used to select a particular advisor and, thus the phone number for that advisor. Then, when the MCD places the voice call back to that number, it goes directly to that advisor in his or her home. But, where a call center is used that is staffed with many advisors all within the same facility and on the some internal phone system, the assigned phone number sent to the MCD may be used, not to directly access a particular advisor, but to call that call center generally and then internally to access the additional available information about the user or user's MCD, with that additional information then being used to determine an appropriate advisor and route the voice call to that advisor.

The assigned call center number may be sent back via a data channel communication path, which may be the same communication path used to send the call request and its transmission identifier, or may be a separate communication path. As will be appreciated, the technique used to send the phone number may depend on the mobile unit technology used including CDMA, GSM, UMTS, VoLTE, etc. At this step, in one embodiment the mobile unit may send an acknowledgment acknowledging the receipt of the phone number via a data channel communication message.

However implemented, the temporarily assigned phone number is used by the MCD at step 206 to establish a voice call with an advisor at the call center. The advisor may then provide the desired or necessary services to the caller (user), which may involve the sending of additional data or programming between the MCD and TSP. This is indicated by the subsequent data. The particular data communication approach used may be selected based on the supported technology. For example, as shown a packet data connection may be used with an MCD that uses GSM, UMTS, or VoLTE, whereas SMS communication may be used for those technologies or for MCDs that use CDMA.

Selection of the temporary (e.g., single session) call center phone number may be done by obtaining the phone number from a pool of phone numbers. This may be carried out at the data center or at the call center such as by using the call center applications 180 shown in FIG. 2. In one embodiment, a phone number is selected based on one or more criteria, including phone numbers reserved for certain language requirement, phone numbers reserved for an emergency condition, etc. In another embodiment, a phone number is selected base on availability. In any case, once a phone number is selected from a pool of available phone numbers then it is associated with the transmission identifier either directly or by way of association with another data item that itself is associated with the transmission identifier. As discussed above, in some embodiments this association permits user or MCD information to be used in routing the received voice call to an appropriate advisor and, as will be discussed more below, allows user or MCD information (such as from the database 84) to be supplied to the advisor to which the call is routed so that the advisor has immediate access to that information at the outset of the voice call. This can help speed the delivery of services to the user and improve the user experience with the TSP.

Once the voice call is terminated the temporarily assigned call center phone number may be discarded by the MCD and at the call center is returned to the pool of available phone numbers.

Turning now to FIG. 4, there is shown a second method of carrying out communications with an MCD. This method may start in the same (or different) manner than that of FIG. 3 wherein a call request is sent containing at least one transmission identifier and perhaps additional data. This call request may be sent over a data channel communication path such as a packet switched connection. In this embodiment, the MCD phone number is sent as a part of the call request, thereby allowing the TSP to directly call back the MCD using that phone number. Thus, this method involves an MCD call origination that actually involves the voice call being originated from the call center. If desired, the call request may be specifically acknowledged; for example, by a return data message indicating that the call center will be calling within the next "n" seconds. This may be useful in providing a short time window in which to have the call center call returned as one way of helping authenticate the incoming call to the MCD. The voice call may be placed by the advisor or automatically by the call center and then connected to a suitable advisor. As in the method 200 above, the transmission identifier and/or additional data received with the call request may be used to select an appropriate advisor. Once the voice call is established with the MCD, the needed or desired services may be supplied to the caller as discussed above in connection with FIG. 3, and then the session terminated.

An advantage to the approach of FIG. 4 is that it dynamically receives the MCD phone number for the voice callback, rather than relying upon a database lookup based on the MCD serial number or other identifier. This may be useful in instances where the MCD phone number might have changed since the database record for the device was last updated. This may also remove the need for the TSP to be involved in the assignment of phone numbers to the MCD.

FIG. 5 provides another, more detailed depiction of the method of FIG. 3, wherein the TSP data and voice call flows are bifurcated into those being handled by the data center 120 and those being handled by the call center 122. This embodiment is an example of how such call flows may be separated between the two operations, but other implementations are possible and will become apparent to those skilled in the art. In the embodiment of FIG. 5, upon receiving the call request from the MCD, the data center accesses information associated with the user (which may include information about the user's MCD) and sends that the call center for use by the advisor that eventually handles the voice call. As shown, this user data is sent to the call center along with the calling code originally included in the call request. It may be used in selecting the assigned phone number sent back to the MCD, but may also be provided to the advisor for use at commencement of the voice call so that there is very little or no delay between the start of the voice call and the advisor's access to the user information. This helps speed the delivery of services to the user and improve the customer experience. Some of the user information that may be useful at the outset of the voice call is the user's name, account subscription information, or information about the MCD or associated with it. Thus, in a vehicle telematics application, the information supplied to the advisor before or just at commencement of the voice call may include the subscriber's name and make/model/year of vehicle, enabling the advisor to start the conversation out in a familiar and friendly manner such as "Good afternoon, Mr. Simon. How is your new Camaro?"

As noted above, in using a data channel communication path, different embodiments may be implemented, including ones that utilize a PBX with ACD/CTI (automated call distribution/computer telephony integration), and ones that do not. For example, where a PBX/CTI architecture is used, when a data call comes in to the data center, it might not necessitate extracting and/or using any of the passed information except the transmission identifier, but rather can defer that process (e.g., defer a database lookup of user or MCD information) until after receiving the voice call from the vehicle. It will just assign a phone number from the pool for the received data call (e.g., via the received transmission identifier) and send that phone number back to the vehicle. When the phone call comes in, it may then use other information from the data call (calling code, location) or use a database lookup based on the transmission identifier or other information from the data call, and use that to identify the appropriate advisor (e.g., based on a language preference) and/or to supply the accessed data to the advisor receiving the call. When used to select an advisor, the call may then be switched to that advisor and the data provided to that advisor as well.

As another example, for a TSP that does not use a PBX and ACD/CTI architecture when an incoming data call comes in to the data center, the transmission identifier and/or other information from the data call may be used to select an appropriate advisor either from the information itself or based on a database lookup using the information. A phone number for the advisor may then be returned to the MCD over a data call. The accessed information will then be transferred to the appropriate advisor, and this may be done immediately or after the MCD uses the assigned phone number to place the voice call. Thus, upon receiving the phone call, the advisor will have the desired information available at the start of the call. As there is no need for PBX/CTI, the advisor need not be physically located at the TSP's facility, but may provide the services from home or another location at which the advisor can receive the voice and data communications from the MCD and data center.

Although the probability is very low, it might happen that, after receiving the initial data call and assigning a single session phone number for use by the MCD for placing the voice call, the call center (or the advisor for PBX less architecture) might receive another call (from some other caller) using that assigned phone number that was reserved for the call from the vehicle. A way to resolve this issue is to send to the MCD via the data call a temporary small unique number (say 2 or 3 digit) in addition to the phone number reserved for the voice call for the session. The vehicle MCD will establish a phone call to the call center using the phone number provided to the vehicle and also send the unique number using DTMF. That unique number will identify that the call is coming from the correct device (because it was sent to the vehicle along with the phone number). The rest of the process may remain the same. Once validated, the unique number may be put back into the pool. The number of digits of the unique number may be selected based on the average call volume of the call center. For example if the average call volume is less than 900, then 3 digits for the unique number may be sufficient. By keeping the temporary assigned unique number small, the time delay due to the DTMF may be kept small.

It will be appreciated by those skilled in the art that, by using the initial data call from the RCD and assigned phone number received back from the data center, a certain amount of authentication of the calling RCD and/or user may be automatically implemented. And, for increased validation, the DTMF signaling may be used in some embodiments, where desired or needed.

Each of the embodiments discussed above also may be used to enable voice and data communication across many generations of wireless communication (e.g., cellular) technology, as well as across different, competing technologies. And, it will be appreciated that the method permits data communication with the TSP without requiring use of a data modem over a voice channel connection, thereby avoiding the need for some technologies in switching back and forth between data and voice modes over the voice call.

As will be appreciated by those skilled in the art, the methods of FIGS. 3-5 may be implemented by particular machines each utilizing a processor, memory, and program instructions that are stored on the memory and that, upon execution by the processor, cause the particular machine to carry out at least a portion of the methods disclosed above. For example, the RCDs, whether it be a vehicle telematics unit, handheld cellular phone, or other wireless or wireline device, may include a processor, programmed memory, and wireless communication circuitry that makes the RCD particular to certain applications of the software programmed in the memory. Similarly, TSP facilities 20 involve special purpose server(s) 82, database(s) 84, and other particular equipment that makes its use and function specific to particular wireless services. The memory used may be a computer readable memory comprising a non-volatile data storage device that does not require constant electrical power to maintain its programming; examples include flash memory and other types of NVRAM (non-volatile random access memory), ROM (read only memory); semiconductor memory, e.g. EPROM (erasable, programmable ROM), EEPROM (electrically erasable, programmable ROM), magnetic or optical disks or tapes; and/or the like.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of carrying out communications with a remote communication device, comprising the steps of:
   (a) receiving a transmission identifier at a data center over a data channel communication path from a remote communication device (RCD), wherein the transmission identifier includes a remote device identifier, a user identifier, or a situational identifier, or any combination thereof;
   (b) associating a call center phone number with the transmission identifier;
   (c) sending the call center phone number to the RCD via a data channel communication path;
   (d) receiving a call at a call center placed from the RCD using the call center phone number; and
   (e) accessing information associated with the RCD or a user of the RCD.

2. The method of claim 1, wherein the same data channel communication path is used in steps (a) and (c) and comprises a short message service (SMS) communication or a packet switched data connection.

3. The method of claim 1, wherein the RCD is a telematics unit installed in a vehicle, wherein at least steps (a) and (c) are carried out by a data center, and wherein the method further comprises receiving at a call center a voice call initiated by the vehicle telematics unit using the phone number.

4. The method of claim 3, further comprising the steps of providing the accessed information to an advisor at the call center and connecting the voice call to the advisor.

5. The method of claim 3, wherein the call center and data center are located at different central facilities.

6. The method of claim 3, wherein step (b) further comprises obtaining the phone number from a pool of available phone numbers and wherein the method further comprises the steps of: carrying out both voice and data communication during the voice call, terminating the voice call, and returning the phone number to the pool of available phone numbers.

7. The method of claim 1, wherein the method further comprises receiving at a call center a voice call initiated by the RCD using the phone number and identifying a language requirement using the accessed information, wherein the connecting step further comprises providing the voice call to an advisor based at least in part on the identification of the language requirement.

8. The method of claim 7, wherein the phone number is selected at least in part based on the language requirement.

9. The method of claim 1, further comprising the steps of providing the accessed information to an advisor at the call center and connecting the voice call to the advisor.

10. The method of claim 9, wherein the accessed information comprises subscriber account information associated with a user of the RCD.

11. The method of claim 10, wherein the accessed information includes a name of the user.

12. The method of claim 1, further comprising the step of providing one or more telematics services in response to a request received from the RCD.

13. The method of claim 1, wherein:
the remote device identifier, when used, comprises a unique identifier associated with the RCD;
the user identifier, when used, comprises a subscriber identifier associated with a user of the RCD; and
the situational identifier, when used, identifies an attribute of a situation for which the call is being placed from the RCD.

14. The method of claim 1, wherein step (b) further comprises obtaining the phone number from a pool of available phone numbers based at least in part on the transmission identifier received during step (a).

15. The method of claim 1, wherein step (b) further comprises obtaining the phone number from a pool of available phone numbers and wherein the method further comprises the steps of: carrying out both voice and data communication during the voice call, terminating the voice call, and returning the phone number to the pool of available phone numbers.

16. A data center, comprising:
at least one computer server connected for communication with a remote communication device via a wireless or wireline network;
a database accessible by the server;
wherein the server operates to carry out the method of claim 1.

17. A computer readable memory comprising a non-volatile data storage device having stored thereon executable program instructions that, upon execution by a processor of a data center server, cause the processor to operate to carry out the method of claim 1.

18. A method of carrying out communications with a remote communication device, comprising the steps of:
(a) receiving a transmission identifier at a call center over a data channel communication path from a remote communication device (RCD), wherein the transmission identifier includes a remote device identifier, a user identifier, location information, or a situational identifier, or any combination thereof;
(b) assigning a single session phone number to the RCD based on the transmission identifier;
(c) sending the single session phone number from the call center to the RCD;
(d) receiving at the call center a voice call initiated from the RCD using the single session phone number; and
(e) connecting the voice call to an advisor based on the single session phone number.

19. The method of claim 18, wherein the single session phone number is a temporary phone number assigned from a pool and returned to the pool for use with other RCDs after the single voice call from the RCD has ended.

20. The method of claim 18, further comprising, prior to step (a), the steps of:
receiving the transmission identifier at a data center over a data channel communication path from the RCD;
obtaining the phone number and associating it with the transmission identifier; and
accessing the information from a subscriber account.

21. The method of claim 20, wherein the data channel communication path comprises a short message service (SMS) communication or a packet switched data connection.

22. The method of claim 20, further comprising the step of identifying a language requirement using the accessed information, wherein step (e) further comprises connecting the voice call to an advisor based at least in part on the identification of the language requirement.

23. The method of claim 20, wherein the obtaining step comprises obtaining a single session phone number that is selected based at least in part on the language requirement.

24. The method of claim 20, wherein the call center and data center are located at different central facilities.

25. A call center, comprising:
a facility having voice and data communication capability for communicating with a remote communication device via a wireless or wireline network, wherein the facility includes at least one special purpose computer programmed to carry out the method of claim 18.

26. A computer readable memory comprising a non-volatile data storage device having stored thereon executable program instructions that, upon execution by a processor of a data center server, cause the processor to operate to carry out the method of claim 18.

27. A method of carrying out communications with a remote communication device, comprising the steps of:
(a) receiving at a data center or a call center a phone number for a remote communication device (RCD) that is sent from the RCD via a data channel communication path;
(b) placing a voice call to the RCD from the data center or call center using the received phone number; and
(c) providing a service to a user of the RCD from the data center or call center in conjunction with the voice call.

28. The method of claim 27, further comprising the step of sending the RCD a notification via a data channel communication path that the voice call will be placed within a certain amount of time.

* * * * *